US006809776B1

United States Patent
Simpson

(10) Patent No.: US 6,809,776 B1
(45) Date of Patent: Oct. 26, 2004

(54) CONTROL OF VIDEO LEVEL BY REGION AND CONTENT OF INFORMATION DISPLAYED

(75) Inventor: Theodore Frederick Simpson, Lancaster, PA (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/403,536

(22) PCT Filed: Dec. 29, 1997

(86) PCT No.: PCT/US97/24210

§ 371 (c)(1),
(2), (4) Date: Mar. 6, 2000

(87) PCT Pub. No.: WO98/48571

PCT Pub. Date: Oct. 29, 1998

Related U.S. Application Data

(60) Provisional application No. 60/044,097, filed on Apr. 23, 1997.

(51) Int. Cl.[7] .................................................. H04N 5/57
(52) U.S. Cl. ....................... 348/565; 348/687; 348/678
(58) Field of Search ................................ 348/588, 564, 348/673, 678, 686, 687, 565, 671; 345/690, 803, 781

(56) References Cited

U.S. PATENT DOCUMENTS

| 5,204,748 A | 4/1993 | Lagoni |
| 5,969,767 A | * 10/1999 | Ishikawa et al. |
| 5,977,946 A | * 11/1999 | Mizobata |

FOREIGN PATENT DOCUMENTS

| EP | 569018 | 11/1993 | ............ H04N/5/45 |
| EP | 675644 | 3/1995 | ............ H04N/5/45 |
| EP | 729273 | 8/1996 | ............ H04N/5/45 |

* cited by examiner

*Primary Examiner*—David E. Harvey
(74) *Attorney, Agent, or Firm*—Joseph S. Tripoli; Joseph J. Laks; Reitseng Lin

(57) ABSTRACT

A video processing system is described for providing an image having more than one region on a display (DISPLAY). The system has a control means which can determine, for each region, the type (e.g., graphics, text, computer programs, broadcast TV video, etc.) of the image material being displayed in the region. The system also has a video driver coupled to the display for providing image signals having contrast and brightness characteristics. The control means generates a control signal for causing said video driver means to adjust said contrast and brightness characteristics of said image signals according to the type of material being displayed in said region.

16 Claims, 6 Drawing Sheets

CONTROL OF VIDEO LEVEL BY REGION AND CONTENT OF INFORMATION DISPLAYED

This application claims the benefit of Provisional Application No. 60/044,097, filed Apr. 23, 1997.

The present invention relates to the display of alphanumeric or graphic information by an image reproducing device such as a kinescope, and, in particular, to a system and method for controlling the video level of an image reproducing device depending on the region and the content of the information being displayed.

Electronic devices such as televisions and personal computers (PC) typically require a video monitor and associated video display controller/processor for displaying images so that information can by conveyed to the users. The present inventor has recognized that, however, the differences in the nature and the content of the material to be shown place disparate requirements on the display. For example, two types of material with different requirements are:

1. Text and line-oriented graphics: These require very sharp video edges, such as black-to-white and white-to-black transitions, and therefore, need a very well-focused, crisp display. These types of materials also tend to have a large percentage of their content displayed at full brightness. Black text on white background is typical, simulating print media on white paper. Since cathode-ray-tubes tend to have larger electron spots at high currents, causing "blooming" and poorer focus, these types of material should be displayed at lower beam currents. This is typical of the way that computer desktop monitors are operated.

2. Real-world photographic-style or television broadcast images; These tend to naturally have softer edges, and so do not have the same requirement for the very sharp focus that text and line graphics do. It is another characteristic of this material that it typically has a lower duty cycle of high brightness material (i.e., most of the video is not at full brightness), but a few bright peaks are required to give the material a realistic "punch" and vividness. This is typical of the way that commercial television receivers are operated. To obtain that realism, the highest level of brightness for this type of material should be displayed at a higher brightness level than the text and graphics as described above.

In EP-A-0729273, a television set is disclosed having the capability to adjust a display parameter for either the main or a PIP image. Likewise in EP-A-0569018, a television set is disclosed which independently adjusts a display parameter of a main display and a sub-display. Both of these disclosures, however, adjust the display parameter based on the instantaneous determination of the real time signal being processed. In addition, neither of these references show any recognition that the signal being processed may be from a source other than a television.

The present inventor has recognized that a problem arises when a display must exhibit both types of material, each of which has its own requirements. This type of setup is found for example, in a device which combines the functions of a personal computer (PC) with a television. For example, a personal computer can be outfitted with a television tuner card, so that a user may watch a television program in one window of provided by the computer's graphical operating system (e.g., Microsoft Windows 95®), while working on a spread sheet application displayed in another window. Another example is a television receiver which is also being used as a PC monitor or has built-in PC capabilities for surfing the internet or performing other computing functions. Video drive level adjustments need to be made to optimize each of the material being displayed.

Another situation where a display must exhibit both types of material is, for example, when a television has an electronic program guide or some other text/graphical On Screen Display (OSD) information that needs to be conveyed to the users, along with real-world, television broadcast information. In addition, such a television may include internet access so that computer graphics and text can be downloaded from the internet for viewing on the television display. The computer graphics and text may be displayed, for example, in a subpicture of a television with a Picture-in-Picture (PIP) or Picture-out-of-Picture (POP) capability, while the main picture is showing the television broadcast channel. These different viewing materials may each require a different drive level to provide the proper picture on the same screen.

The inventor has recognized that drive level adjustment between two or more types of material may be made manually, if only one is shown on the display at a time. This might be done with the monitor's contrast control, for example. However, with systems such as those that combine the functionality of a PC and TV, it is common that more than one type of material will appear on the screen simultaneously. For this reason, it is desirable for the system to be able to adjust the video drives for each type of the display material in each region of the display screen automatically and independently, depending on the content of the material being displayed.

Accordingly, a video processing system and method is provided for presenting an image having more than one region on a display. The system has a control processor which can determine, for each region, the type (e.g., graphics, text, computer programs, broadcast TV video, etc.) of the image material being displayed in the region. The system also has a video driver coupled to the display for providing image signals having contrast and brightness characteristics. The control processor generates a control signal for causing the video driver to adjust the contrast and brightness characteristics of the image signals according to the type of material being displayed in the region.

Another aspect of the present invention provides for manual adjustment of the image characteristics for each of the regions independently, therefore, allowing a user to adjust the drive level for each region to suit his or her own taste.

The invention will be further explained by reference to the drawings in which.

Figure 1:
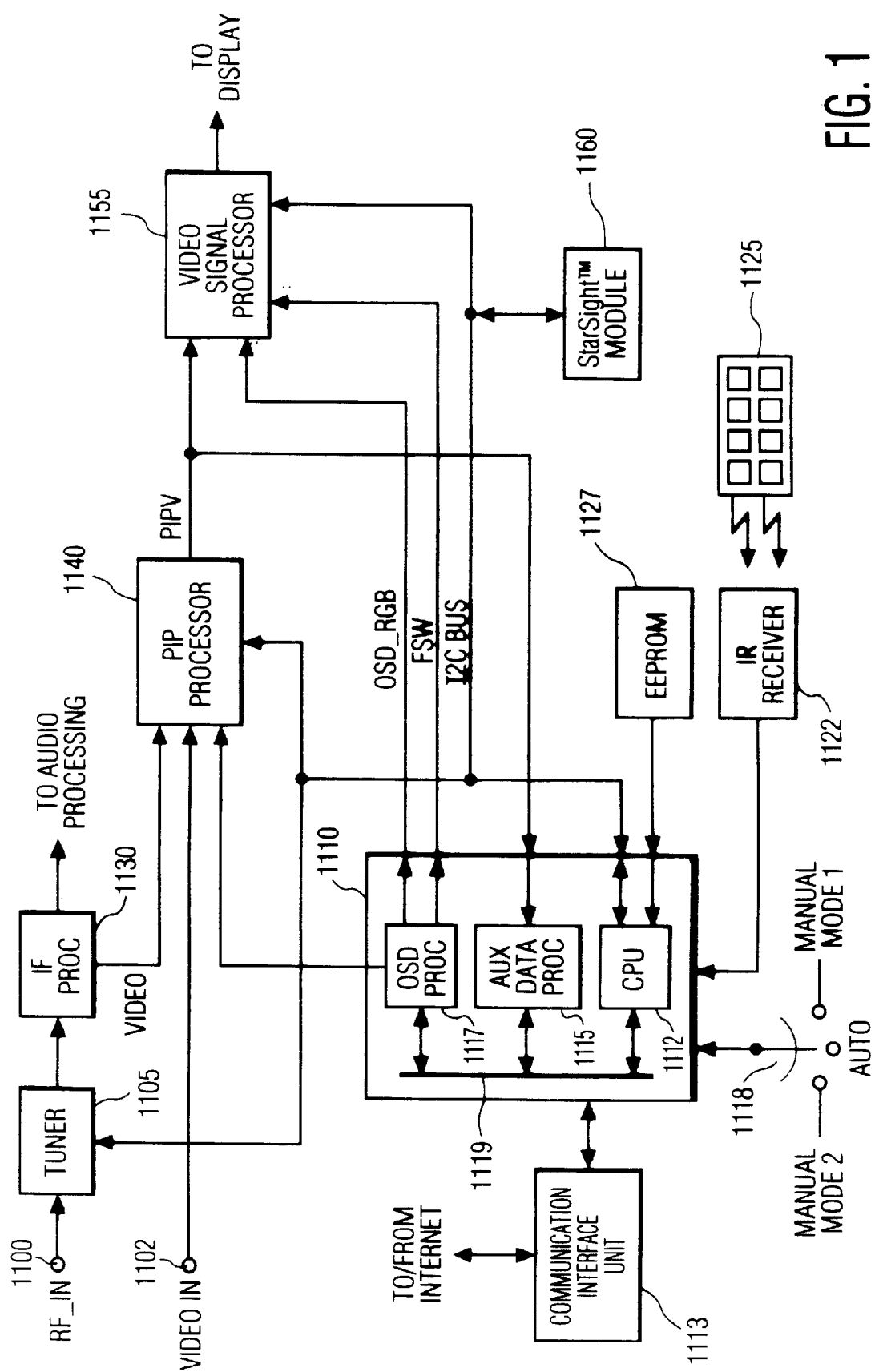
FIG. 1 shows a block diagram of a television incorporating the principals of the present invention.

FIG. 1 shows a television receiver receiving for processing both analog NTSC television signals and internet information. The system shown in FIG. 1 has a first input 1100 for receiving television signal RF_IN at RF frequencies and a second input 1102 for receiving baseband television signal VIDEO IN. Signal RF_IN may be supplied from a source such as an antenna or cable system while signal VIDEO IN may be supplied, for example, by a video cassette recorder (VCR) or a gaming device (both not shown in FIG. 1). Tuner 1105 and IF processor 1130 operate in a conventional manner for tuning and demodulating a particular television signal that is included in signal RF_IN. IF processor 1130 produces baseband video signal VIDEO representing the video program portion of the tuned television signal. IF processor 1130 also produces a baseband audio signal that is coupled to an audio processing section (not shown in FIG. 1) for further audio processing. Although FIG. 1 shows input 1102 as a baseband signal, the television receiver could include a second tuner and IF processor similar to units 1105 and 1130 for producing a second baseband video signal from either signal RF_IN or from a second RF signal source.

The system shown in FIG. 1 also includes a main microprocessor (μP) 1110 for controlling components of the television receiver such as tuner 1105, picture-in-picture processing unit 1140, video signal processor 1155, and StarSight® data processing module 1160. As used herein, the term "microprocessor" represents various devices including, but not limited to, microprocessors, microcomputers, microcontrollers, control processors, and controllers. Micro processor 1110 controls the system by sending and receiving both commands and data via serial data bus $I^2C$ BUS which utilizes the well-known $I^2C$ serial data bus protocol. More specifically, central processing unit (CPU) 1112 within μP 1110 executes control programs contained within memory, such as FEPROM 1127 shown in FIG. 1, in response to commands provided by a user, e.g., via IR remote control 1125 and IR receiver 1122. For example, activation of a "CHANNEL UP" feature on remote control 11425 causes CPU 1112 to send a "change channel" command along with channel data to tuner 1105 via $I^2C$ BUS. As a result, tuner 1105 tunes the next channel in the channel scan list. The control program stored in EEPROM 1127 also includes software for implementing the operations shown in FIG. 2.

Main microprocessor 1110 also controls the operation of a communications interface unit 1113 for providing the capability to download and upload information from the internet. Communication interface unit 1113 includes, for example, a modem for connecting to an Internet service provider, e.g., via a telephone line or via a cable television line. The communication capability allows the system shown in FIG. 1 to provide email capability and internet related features such as web browsing in addition to receiving television programming.

CPU 1112 controls functions included within μP 1110 via bus 1119 within μP 1110. In particular, CPU 1112 controls auxiliary data processor 1115 and on-screen display (OSD) processor 1117. One function of the auxiliary data processor 1115 is to extract auxiliary data such as StarSight® data from video signal PIPV.

StarSight® system is an Electronic Program Guide (EPG) provided by StarSight Telecast, Inc. An EPG is an interactive, on-screen equivalent to TV listings found in local newspapers or other print media. The information contained in an EPG includes programming characteristics such as channel number, program title, start time, end time, elapsed time, time remaining, rating (if available), topic, theme, and a brief description of the program's content. Aspects of the StarSight® system are described in U.S. Pat. Nos. 5,353,121, 5,479,268, and 5,479,266 issued to Young et al. and assigned to StarSight Telecast, Inc.

StarSight® data is typically received only on a particular television channel and the television receiver must tune that channel to extract StarSight® data. To prevent StarSight® data extraction from interfering with normal use of the television receiver, CPU 1112 initiates StarSight® data extraction by tuning the particular channel only during a time period when the television receiver is usually not in use (e.g., 2:00 AM). At that time, CPU 1112 configures decoder 1115 such that auxiliary data is extracted from horizontal line intervals such as line 16 that are used for StarSight® data. CPU 1112 controls the transfer of extracted StarSight® data from decoder 1115 via $I^2C$ BUS to StarSight® module 1160. A processor internal to the module formats and stores the data in memory within the module. In response to the StarSight® EPG display being activated (e.g., a user activating a particular key on remote control 125), CPU 1112 transfers formatted StarSight® EPG display data from StarSight® module 1160 via $I^2C$ BUS to OSD processor 1117.

OSD processor 1117 operates in a conventional manner to produce R, G, and B video signals OSD_RGB that, when coupled to a display device, will produce a displayed image representing on-screen display information such as graphics and/or text comprising an EPG or graphics and/or text downloaded from internet as described below. OSD processor 1117 also produces control signal FSW which is intended to control a fast switch for inserting signals OSD_RGB into the system's video output signal at times when an on-screen display is to be displayed. For example, when a user enables an EPG, e.g., by activating a particular switch on remote control 1125, CPU 1112 enables processors 1115 and 1117 so that processor 1115 first requests and receives EPG data from StarSight® module 1160 via $I^2C$ BUS. Processor 1117 then produces signals OSD_RGB representing the closed caption data. Processor 1117 also produces signal FSW indicating when the EPG is to be displayed.

Another function of the OSD processor 1110 is to generate computer text or graphics obtained from the internet, in cooperation with the communication interface unit 1113 and the Auxiliary Data Processor 1115. The communication interface unit 1113 demodulates the analog information into digital format and passes it to the Auxiliary Data Processor 1115 for further processing. The OSD processor then formats this digital information into RGB signals suitable for used by the Video Signal Processor 1155. As described above, the OSD produces control signal FSW which is intended to control a fast switch for inserting signals OSD_RGB into the system's video output signal at times when internet graphics and text is to be displayed.

Video signal processor (VSP) 1155 performs conventional video signal processing functions, such as luma and chroma processing and contrast and brightness adjustment. Output image signals produced by VSP 1155 are suitable for coupling to a display device, e.g., a kinescope or LCD device (not shown in FIG. 1), for producing a displayed image. VSP 1155 also includes a fast switch for coupling signals produced by OSD processor 1117 to the output video signal path at times when graphics and/or text is to be included in the displayed image. The fast switch is controlled by control signal FSW which is generated by OSD processor 1117 in main microprocessor 1110 at times when text and/or graphics are to be displayed.

The input signal for VSP 1155 is signal PIPV that is output by picture-in-picture (PIP) processor 1140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. PIP processor 1140 provides the described functionality in a conventional manner using features included in unit 1140 such as a video switch, analog-to-digital converter (ADC), RAM, and digital to analog converter (DAC).

Figure 5A:
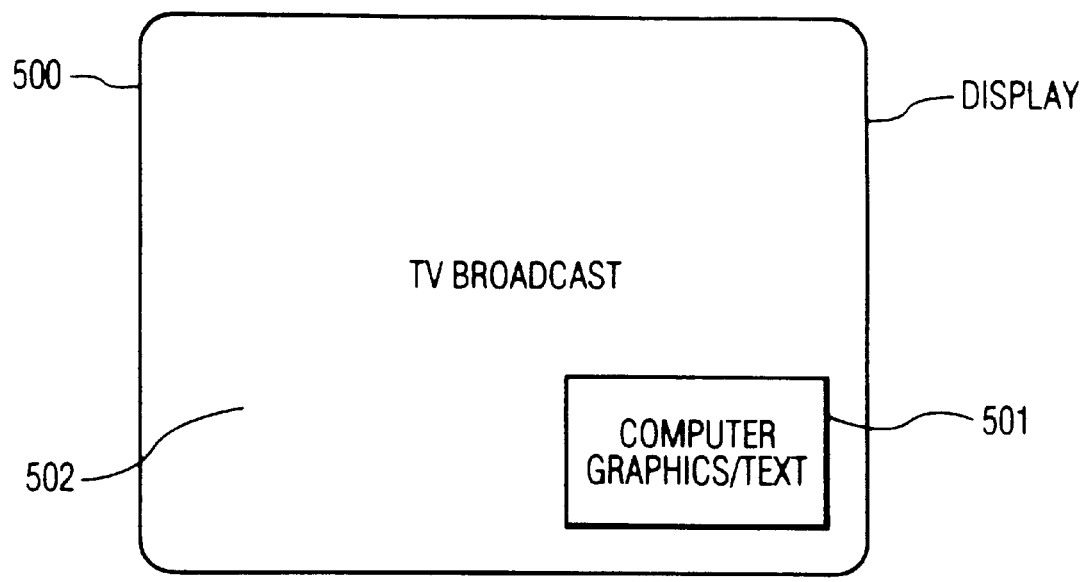
FIGS. 5A and 5B depicts displays having different materials being shown in different regions in accordance with the present invention.

As described above, and as shown in FIG. 5A, the subpicture 501 of the PIP image 500 of the television may be used to present text and/or graphics information from the internet, or text and/or graphics information from the EPG while the main picture 502 is showing a TV broadcast channel. This is accomplished by feeding the processed digital signals from the OSD processor 1117 directly to one of the inputs of the PIP processor. As it is well known in the art, the video switch typically contained in the PIP processor 1140 receives all the signal inputs (e.g., VIDEO, VIDEO IN, and signal from OSD as shown in FIG. 1). Then the PIP processor under the control of the main microprocessor 1110, selects and switches the appropriate signals to be displayed during the appropriate main and subpicture scanning intervals. Conventional subsampling techniques are used to form the subpicture.

For an EPG display, the display data included in the EPG display is produced by OSD processor 1117 and included in the output signal by VSP 1155 in response to fast switch signal FSW. When controller 1110 detects activation of the EPG display, e.g., when a user presses the appropriate key on remote control 1125, controller 1110 causes OSD processor 1117 to produce the EPG display using information such as program guide data from StarSight® module 1160. Controller 1110 causes VSP 1155 to combine the EPG display data from OSD processor 1117 and the video image signal in response to signal FSW to produce a display including EPG. The EPG can occupy all or only a portion of the display area.

When the EPG display is active, controller 1110 executes another control program stored in EEPROM 1127. The control program monitors the location of a position indicator, such as a cursor and/or highlighting, in the EPG display. A user controls the location of the position indicator using direction and selection keys of remote control 1125. Alternatively, the system could include a mouse device. Controller 1110 detects activation of a selection device, such as clicking a mouse button, and evaluates current cursor location information in conjunction with EPG data being displayed to determine the function desired, e.g., tuning a particular program. Controller 1110 subsequently activates the control action associated with the selected feature.

Examples of suitable components for implementing the exemplary embodiment include an ST9296 microprocessor produced by SGS-Thomson Microelectronics for providing the features associated with μP 1110; an M65616 picture-in-picture processor produced by Mitsubishi for providing the described basic PIP functionality associated with PIP processor 1140; and an LA7612 video signal processor produced by Sanyo for providing the functions of VSP 1155.

In accordance with the present invention, the main microprocessor 1110, under the supervision of the control programs contained within memory EEPROM 1127, will direct the video signal processor 1155 to provide the proper drive levels to the display, via the bus I²C BUS. As shown in the processing steps of FIG. 2, as the video signal processor is providing drive current for picture rasters, the main microprocessor 1110 will first determine which region the rasters belong to. A region, for example, may be a main or subpicture in the PIP mode. As discussed above, the main picture may be displaying the TV images and the subpicture of the PIP may be showing internet text and/or graphics or an EPG, or vise versa.

Figure 2:
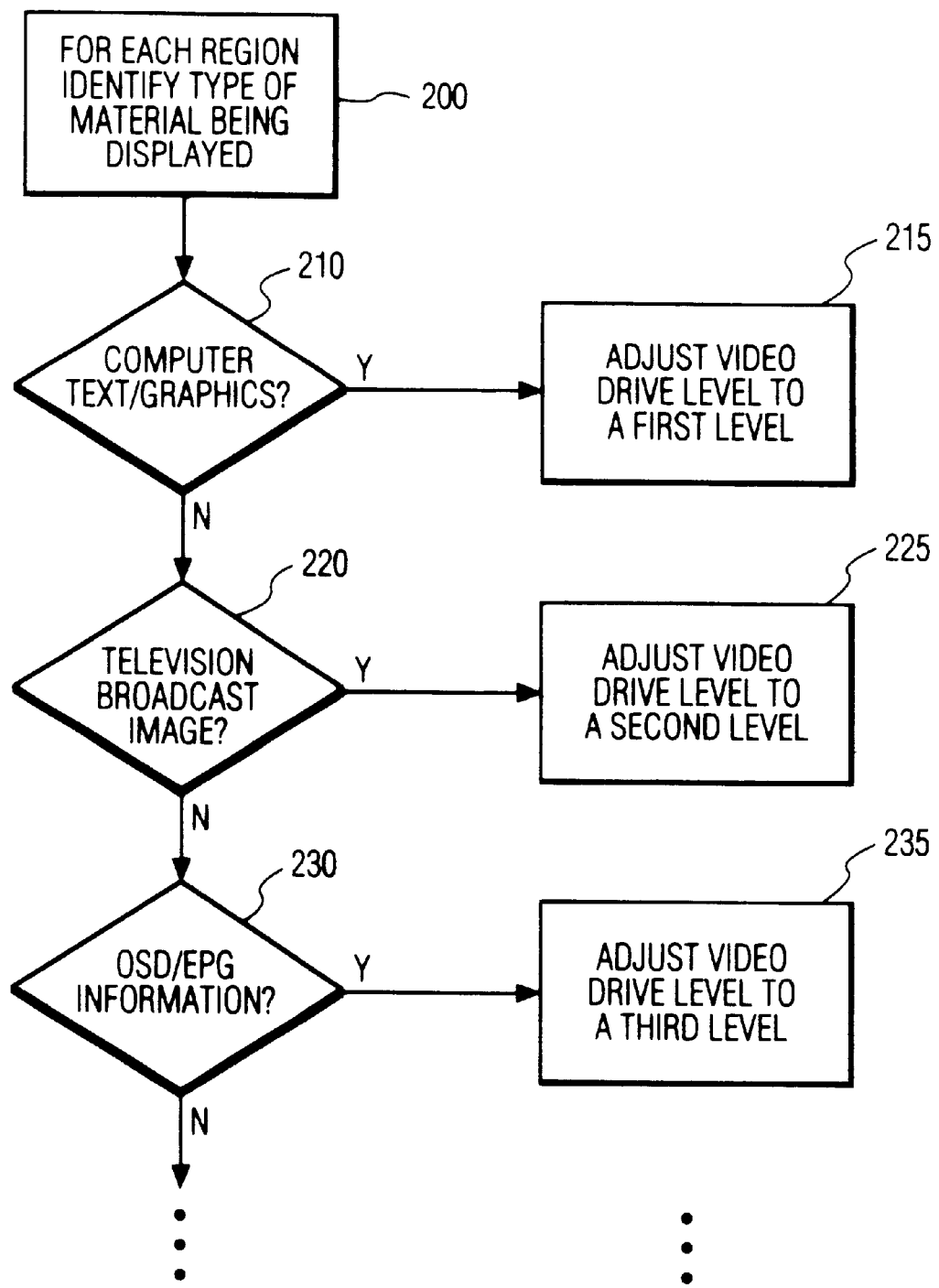
FIG. 2 shows the steps of an exemplary process to accomplish the present invention.

The microprocessor 1110 will then determine whether the material being displayed is: 1) a computer text/graphics image such as information obtained from the internet, 2) a television broadcast image, or 3) an OSD information such as an EPG, as shown in steps 210, 220 and 230 of FIG. 2. The main microprocessor 1110 makes this determination by coordinating and monitoring the operations of the OSD processor 1117, CPU 1112, and the Auxiliary Data Processor 1115. The main microprocessor 1110 will then provide a control signal to the video signal processor so that the video signal processor 1155 can provide the desired video drive level to the display for the particular material being displayed during the associated scanning interval.

In addition, FIG. 1 includes a control switch 1118 coupled to microprocessor 1110. The control switch 1118 can be used to select the mode of operation for the television set. For example, when a user selects the "auto mode", the television operates automatically to adjust the image characteristics of the drive signals for each display region as described above. When the switch is in the "manual mode 1" position, the user may only adjust the image characteristic of the entire screen. When the switch is in "manual mode 2" position, the television may provide a prompt for the user to select the desired image characteristic for each region. This aspect of the invention will be further described in regard to a PC implementation shown in FIGS. 3 and 4.

Figure 3:
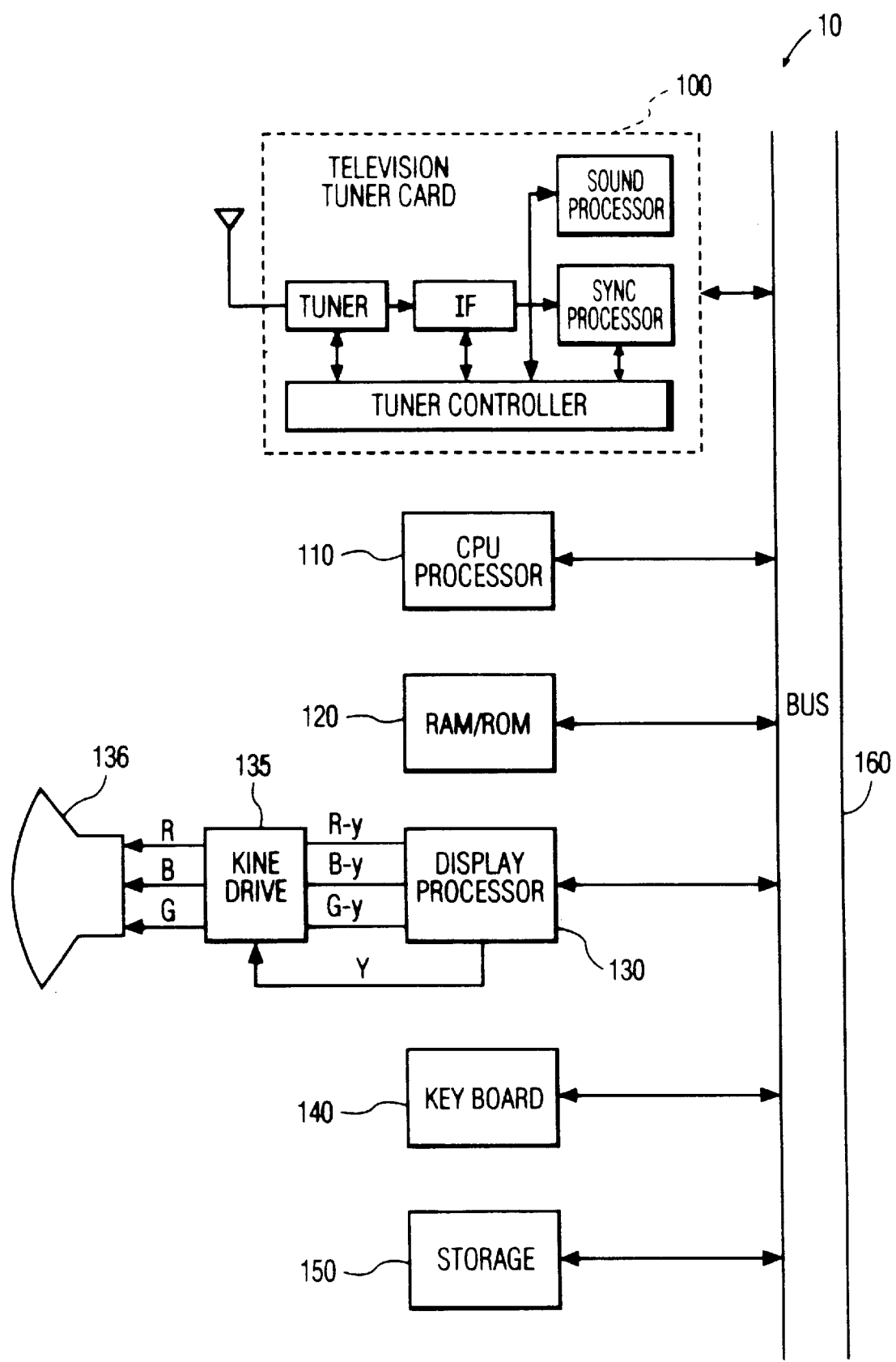
FIG. 3 is a block diagram of an exemplary PC which incorporates the principals of the present invention.

FIG. 3 shows another example of an electronic device implementing a video drive control system in accordance with the present invention. The example is a computer system having a television tuner card installed in one of its computer card slots.

The computer system 10 is under the control of a CPU processor 110. The computer includes a display processor 130 for controlling a kine drive 135 of an associated display monitor 136. The display processor 130, under the control of the CPU processor 110 via a computer operating system to be discussed later, provides for each pixel a desired video drive level.

Figure 5B:
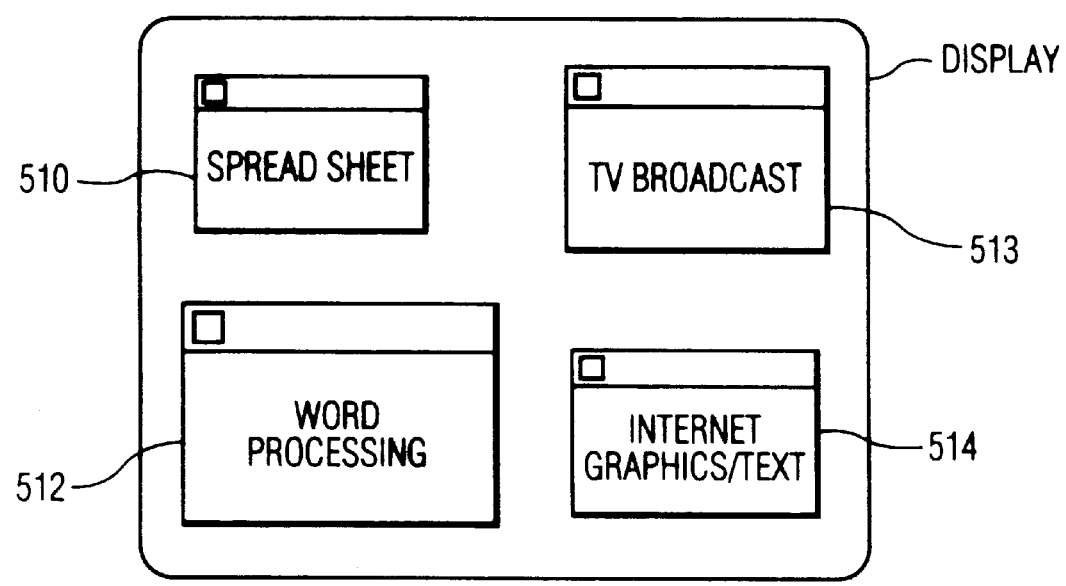

The computer system 10 includes a television tuner card 100 for receiving television signals to be displayed. It is known, for example, to be able to concurrently display a television image in one of the windows under, for example, a windows based operating system, while performing other computing applications in other windows, as shown in FIG. 5B. An example of an expansion card having a TV tuner that can be used with an IBM-compatible PC is "All-In-Wonder"™ card made by ATI Technologies Inc., of Canada.

Figure 4:
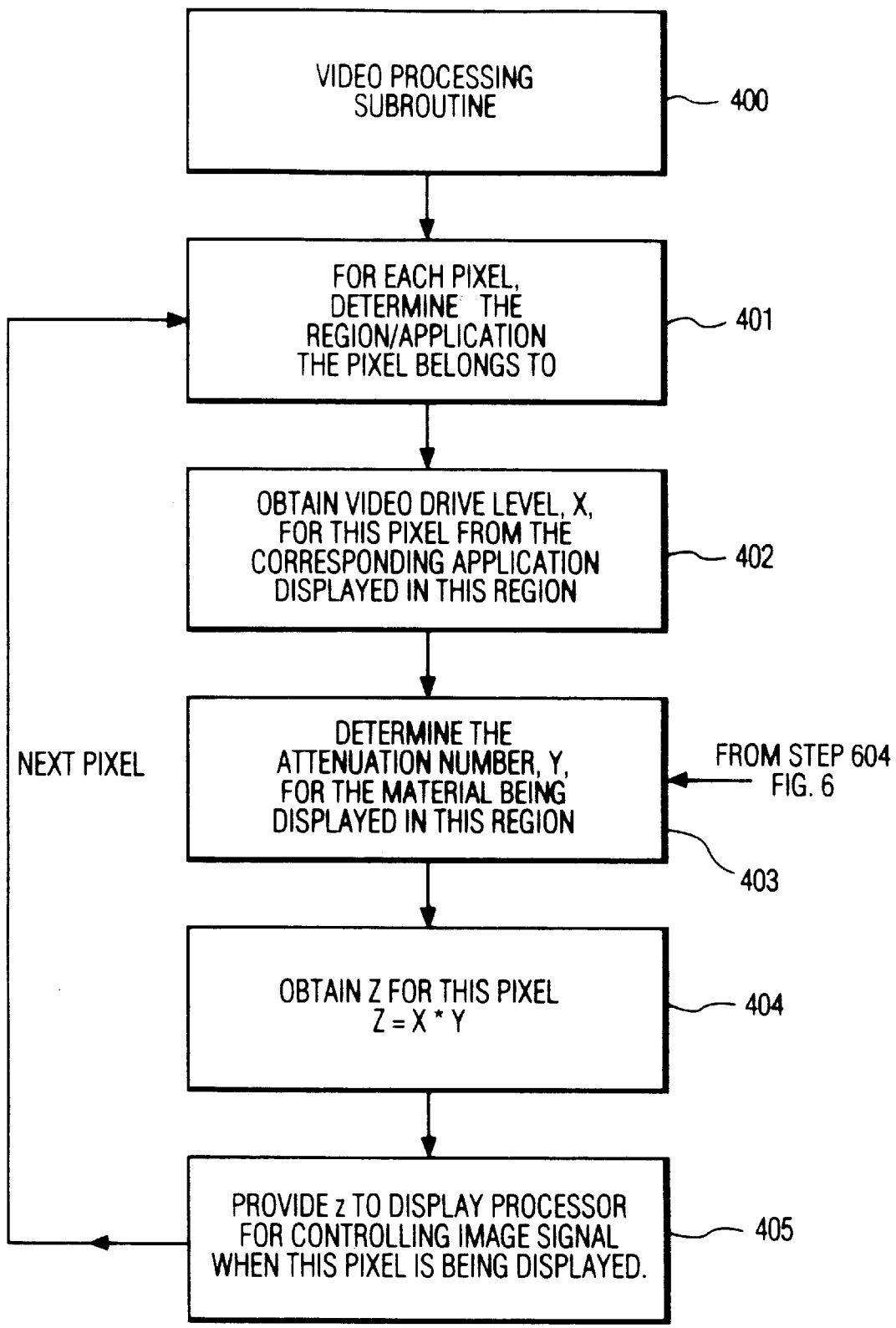
FIG. 4 is another exemplary process for implementing the present invention.

FIG. 4 shows in a flowchart form a feature of the system shown in FIG. 3. In FIG. 4, the operating system of the PC has a video processing subroutine 400 to provide the proper display drive control for each pixel of the display according to the principles of the present invention.

The operating system which contains the video processing subroutine 400, provides to the display processor 130 intensity information such as contrast and brightness characteristics about each pixel, as each pixel is being displayed on the display monitor 136 in the display scanning process. This intensity information typically corresponds to R, G, and B drive levels for each pixel on the display.

The operating system knows the location and the boundary of the windows or regions since the operating system is responsible for coordinating the resources among the different applications being displayed. Therefore, as each pixel is being displayed in the CRT scanning process, the operating system first determines which region or application this pixel belongs to, as shown in Step 401.

Once this is determined, the operating system then obtains a normal drive level (X) for this pixel from the corresponding application program as shown in step 402. The drive levels (X) for a pixel in an application are normally represented internally as numbers, which can be represented as fractions of the maximum drive level. These might be thought of, for example as 0, 0.25, 0.50, 0.75, and 1.00, although many more levels are usually incorporated.

To exert the required control of regions in accordance with the type of the material or information being displayed, these drive numbers, received from the application being displayed in a window, would be multiplied by a second number Y as shown in step 403. The second number Y is an attenuation number associated with the window currently being scanned. For example, the high-drive picture regions corresponding to real-world photographic style or television broadcast images might have an assigned attenuation number Y of 1.0 (no attenuation), but the computer-related text/graphics regions might have an assigned attenuation number Y of 0.25 (4 to 1 attenuation).

Each pixel appearing in a window, which is of a certain type, is thereafter assigned an associated, final, attenuation level or a drive signal level Z. This level, Z, is derived from, for example, the multiplication of the normal application video level X for each pixel in the region by the assigned attenuation number Y for that region or window, resulting in independent control of each region's video level appropriate for its type of material being presented, as shown in step 404. This number Z is then provided to the display processor 130 which will drive the kine drive 135 and the associated display 136 at the appropriate level for each pixel. This process is then repeated for each pixel of the displayed image until the system 10 is turned off.

In accordance with another aspect of the present invention, the system shown in FIG. 3 may provide a user interface feature to provide user adjustment of the final drive level for each window or application on the screen. This function is similar to that described above when switch 1118 of the television shown in FIG. 1 is in "manual mode 2" position.

Figure 6:
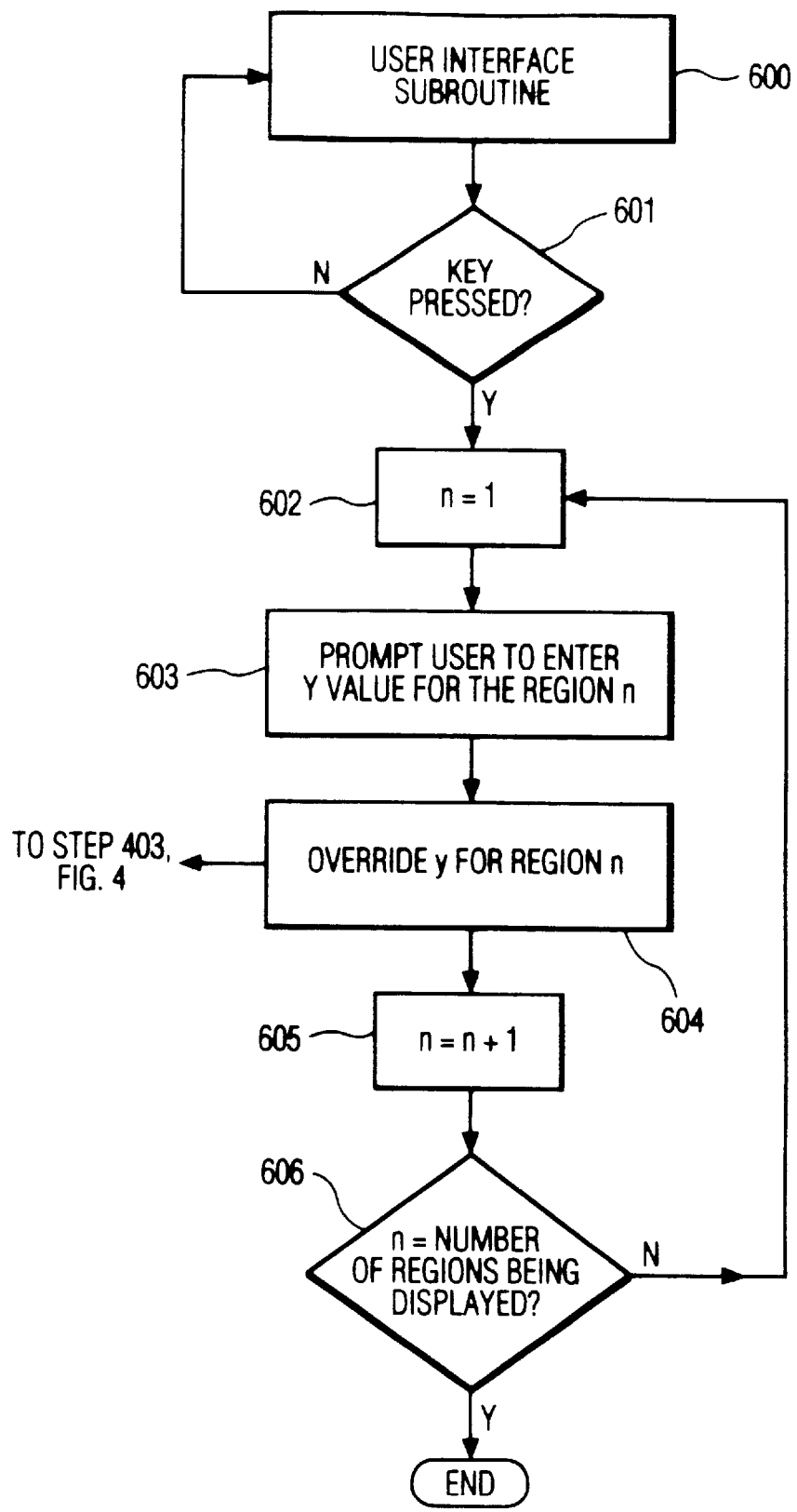
FIG. 6 is an example of a subroutine which allows a user to adjust the drive level for each of the regions being displayed.

FIG. 6, steps 600 to 606, show in flow chart form, a user interface feature according to the present invention. The feature illustrated in FIG. 6 may be implemented as a subroutine of the operating system that is exercised by CPU 110 of the system shown in FIG. 3. The user can, for example enter a key on a keyboard (not shown) of the computer system 100 to invoke this feature, as shown in Step 600. Thereafter, the computer system 100 will prompt the user via the display screen 136 to enter a new, overriding attenuation number Y for each region shown on the screen, as shown in Step 603. Once a number is entered by the user, the computer system overrides the old attenuation number Y previously derived by the CPU processor with this new number Y, thereby causing the final drive level Z for this particular window to be adjusted according to the user's taste. Thus the user is able to manually adjust the drive level for each of the regions currently being displayed on the computer screen.

The above described concepts according to the present invention can be extended, if desired, to several levels of control for numerous types of presentation materials, to optimize the drive level of each region, according to the content.

It is to be understood that the embodiments and variations shown and described herein are for illustrations only and that various modifications may be implemented by those skilled in the art without departing from the scope and spirit of the invention.

What is claimed is:

1. A video processing system for providing an image having more than one region, comprising:

means for obtaining for each region of the image, data indicating a type of information to be displayed in each region before processing the information in each region;

means for deriving a display level for each region of the image according to the data obtained indicating the type of information being displayed in each region; and means for adjusting the display level for each region as the image is displayed, wherein the display level is derived by obtaining a normal drive level for each pixel and an attenuation number for each region of the image being displayed.

2. The system of claim 1 wherein the data indicate that the information corresponds to a television program.

3. The system of claim 1 wherein the data indicate that the information corresponds to computer generated text and/or graphics.

4. The system of claim 1, 2, or 3, wherein the display level corresponds to a contrast level.

5. The system of claim 1, 2, or 3, wherein the display level corresponds to a brightness level.

6. The system of claim 1, wherein the display level for each pixel of the image is derived by multiplication of the normal drive level and the attenuation number for the pixel.

7. The system of claim 1 wherein the data obtained is provided by a program associated with a particular region.

8. The system of claim 1 wherein the data obtained is specified by a user.

9. A method for providing a displayed image having more than one display region comprising the steps of:

obtaining for each region of the displayed image, data indicating a type of information to be displayed in each region before processing the information in each region;

deriving a display level for each region of the image according to the data previously obtained indicating the type of information being displayed in each region by obtaining a normal drive level for each pixel and an attenuation number for each region of the image being displayed; and adjusting the display level for each region as the image is displayed.

10. The method of claim 9 wherein the data indicate that the information corresponds to a television program.

11. The method of claim 9 wherein the data indicate that the information corresponds to computer generated text and/or graphics.

12. The method of claim 9, 10, or 11, wherein the display level corresponds to a contrast level.

13. The method of claim 9, 10, or 11, wherein the display level corresponds to a brightness level.

14. The method of claim 9, wherein the display level for each pixel of the displayed image is derived by multiplication of the normal drive level and the attenuation number for the pixel.

15. The method of claim 10 wherein the data obtained is provided by a program associated with a particular region.

16. The method of claim 10 wherein the data obtained is specified by a user.

* * * * *